United States Patent
Motozono et al.

(10) Patent No.: US 9,073,549 B2
(45) Date of Patent: Jul. 7, 2015

(54) VEHICLE CONTROL APPARATUS

(75) Inventors: Yoshikazu Motozono, Toyota (JP); Shoichi Shono, Toyota (JP); Akihiro Ueda, Toyota (JP); JongGap Kim, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/365,426

(22) PCT Filed: Dec. 20, 2011

(86) PCT No.: PCT/JP2011/007117
§ 371 (c)(1),
(2), (4) Date: Jul. 22, 2014

(87) PCT Pub. No.: WO2013/093962
PCT Pub. Date: Jun. 27, 2013

(65) Prior Publication Data
US 2015/0006045 A1     Jan. 1, 2015

(51) Int. Cl.
*G01C 21/26* (2006.01)
*B60W 30/18* (2012.01)
*B60K 6/445* (2007.10)
*B60W 10/184* (2012.01)
*B60W 20/00* (2006.01)
*B60W 50/00* (2006.01)

(52) U.S. Cl.
CPC ............... *B60W 30/18* (2013.01); *B60K 6/445* (2013.01); *B60W 10/184* (2013.01); *B60W 20/00* (2013.01); *B60W 2030/1809* (2013.01); *B60W 2530/14* (2013.01); *B60W 2540/12* (2013.01); *B60W 2050/0089* (2013.01); *B60W 2550/142* (2013.01); *B60W 2550/143* (2013.01); *B60W 2550/402* (2013.01); *Y02T 10/6239* (2013.01)

(58) Field of Classification Search
None
See application file for complete search history.

(56) References Cited

U.S. PATENT DOCUMENTS 5,539,397 A *  7/1996  Asanuma et al. ............. 340/901
8,494,737 B2 *  7/2013  Maier et al. ..................... 701/65
8,712,676 B2 *  4/2014  Hiestermann et al. ........ 701/119

FOREIGN PATENT DOCUMENTS

JP     2007-156704 A     6/2007

* cited by examiner

*Primary Examiner* — Dirk Wright
(74) *Attorney, Agent, or Firm* — Sughrue Mion, PLLC

(57) ABSTRACT

Provided is a vehicle control apparatus that can improve a gasoline mileage without imparting the sense of discomfort to a driver. When an ECU determines that the brake is turned ON during an N inertia travel control ("YES" in step S11), the ECU stores a current position and a current vehicle speed in a learning DB (Step 12). Next, the ECU matches a data of the current position and the vehicle speed similar to the data of the current position and the vehicle speed stored this time, with reference to the information associated with a section inclusive of the current position (Step S13). Thereafter, when the ECU determines that there are equal to or more than a predetermined number of similar cases ("YES" in step S14), the ECU sets the section referenced in the step S13 as an N inertia travel prohibition section.

18 Claims, 9 Drawing Sheets

FIG.3

| | C1 | C2 | C3 | C4 | B1 | B2 | B3 | B4 | F1 | F2 | F3 | F4 |
|---|---|---|---|---|---|---|---|---|---|---|---|---|
| P | | | | | | | | | | | | |
| R | | | ○ | | (○) | | | ○ | ○ | | | |
| N | | | | | | | | | | | | |
| 1st | ○ | | | (○) | | | | (○) | | | ○ | ○ |
| 2nd | ○ | | | (○) | (○) | ○ | | | ○ | ○ | | ○ |
| 3rd | ○ | | ○ | (○) | (○) | | △ | | ○ | | | ○ |
| 4th | ○ | ○ | △ | (○) | | | △ | | | | | ○ |
| 5th | △ | ○ | ○ | | ○ | | △ | | | | | |
| 6th | △ | ○ | | | △ | ○ | △ | | | | | |

○ ENGAGEMENT    (○) ENGAGEMENT AT ENGINE BRAKE TIME    △ ENGAGEMENT NOT CONTRIBUTING TO POWER TRANSMISSION

VEHICLE CONTROL APPARATUS

CROSS REFERENCE TO RELATED APPLICATIONS

This is a National Stage of International Application No. PCT/JP2011/007117 filed Dec. 20, 2011, the contents of which are incorporated herein by reference in its entirety.

TECHNICAL FIELD

The present invention pertains to a vehicle control apparatus mounted on a vehicle that can travel in an inertial travel during a time when the vehicle is not driven by a driving power.

BACKGROUND ART

Up until now, there have been known vehicle control apparatuses adapted to obtain information indicative of a road status of a current position of the vehicle and the road status of a position ahead of the current position, and to encourage a driver with a driving operation in accordance with the road status of the position ahead, thereby improving a gasoline mileage of the vehicle.

As one of such the vehicle control apparatuses mentioned above, there is known a driving system adapted to encourage the driver with an operation of an accelerator pedal and a brake pedal in accordance with an inclination of the road at the position ahead (For example, see Patent Document 1).

The driving system disclosed in the Patent Document 1 comprises a vehicle position determination means to determine the current position of the vehicle, an inclination information storing means to store the inclination information of the read, and a decision means to decide the driving operation for improvement of the gasoline mileage based on signals inputted from the vehicle position determination means and the inclination information storing means, wherein the decision means is adapted to decide a timing of accelerator pedal operation and brake pedal operation in favor of an improvement of the gasoline mileage and to notify the driver of the timing.

By the construction as set forth in the above definition, the decision means is adapted to obtain the inclination information of the road at the position ahead of the current position from the inclination information storing means and to decide an optimal timing that the accelerator pedal or the brake pedal be depressed by the driver, thereby improving the gasoline mileage of the vehicle.

In addition, further improvement of the gasoline mileage can be realized by a vehicle control apparatus adapted to decide the driving operation for improvement of the gasoline mileage based on information inputted from the vehicle position determination means and the inclination information storing means as disclosed in the driving system disclosed in the Patent Document 1, and to have the vehicle travel in an inertia travel by intercepting a driving power transmitted from a power source to driving wheels.

CITATION LIST

Patent Literature

Patent Document 1: Japanese Patent Application Publication No. 2007-156704

SUMMARY OF INVENTION

Technical Problem

Although the driving system disclosed in the Patent Document 1 is adapted to decide an optimal driving operation based on the traveling position of the vehicle and the inclination information, when the inclination of the road in a case and the inclination of the road in other case are the same with each other, the driving system disclosed in the Patent Document 1 decides the same driving operation as the optimal operation, regardless of a difference of road state other than the inclination of the road between the case and the other case.

Accordingly, the driving system disclosed in the Patent Document 1 is likely to decide the driving operation which is not in line with a desired driving operation of the driver, when the desired driving operation of the driver varies depending on an actual road status such as whether or not a view of the road is good, whether or not there is a merge with other vehicles, or the like, even though the road inclination is the same. Particularly, in the driving system disclosed in the Patent Document 1 coupled with the inertia travel, the inertia travel is likely to be started at a travelling position which is not desirable for the driver, or the inertia travel is likely to be started even when the inertia operation can be continued for a short time. For this reason, the driving system disclosed in the Patent Document 1 is likely to impart a sense of discomfort to the driver or deteriorate the gasoline mileage.

The present invention has been made to overcome the previously mentioned conventional problems and it is therefore an object of the present invention to provide a vehicle control apparatus which can improve the gasoline mileage without imparting the sense of discomfort to the driver.

Solution to Problem

To achieve the above object, the present invention provides a vehicle control apparatus that can stop a transmission of a driving power from a power source of a vehicle to driving wheels of the vehicle while the vehicle is traveling, comprising a position determination unit that determines a current position of the vehicle, a road information storing unit that stores a road information indicative of a road inclusive of the current position of the vehicle determined by the position determination unit in association with a road status of the road, an inertia travel unit that stops the transmission of the driving power from the power source to the driving wheels based on the road information indicative of a road ahead of the current position, to have the vehicle travel in an inertia travel, a drive operation detecting unit that detects drive operations indicative of at least a suspension of the inertia travel and a start of the inertia travel, a suspension information storing unit that stores therein an information indicative of the current position and of a fact that the inertia travel is suspended thereat, in association with the road information thereat, in the case that the drive operation indicative of the suspension of the inertia travel is detected, and an inertia travel prohibition unit that prohibits the inertia travel of the vehicle in a predetermined section inclusive of the current position based on the information stored in the suspension information storing unit.

By the construction as set forth in the above definition, even in a case that the inertia travel is being performed, when the inertia travel is suspended by the operation of the driver, the vehicle control apparatus according to the present invention can store the information, indicative of the fact that the inertia travel control is suspended by the driving operation of the driver, in association with the position information. For this reason, performance of the inertia travel control can be prohibited in a case that the vehicle travels at the same position from next time on. Accordingly, for example, even if the inclination of the road at the current position is equal to the inclination of another road in which the inertia travel control is permitted, when the driver does not desire the inertia travel control and applies the brake due to a fact such as that the road width ahead of the current position is narrower, the vehicle control apparatus according to the present invention can store information indicative of the prohibition of the inertia travel control, thereby making it possible to avoid the performance of the inertia travel control the next time the vehicle travels the section inclusive of the current position. Therefore, the vehicle control apparatus according to the present invention can prevent the inertia travel control, which imparts the sense of discomfort to the driver, from being performed, while the gasoline mileage can be improved by performing the inertia travel control.

The vehicle control apparatus according to the present invention may preferably be so constructed that the inertia travel prohibition unit prohibits the inertia travel of the vehicle in a predetermined section inclusive of the current position on a condition that the number of informations indicative of the suspension of the inertia travel associated with the current position becomes equal to or more than a predetermined value.

By the construction as set forth in the above definition, in a case that there are less than the predetermined number of incidents in which the inertia travel control is suspended, the vehicle control apparatus according to the present invention can prevent the inertia travel control from being prohibited in the section inclusive of the current position. Therefore, even if the inertia travel control is suspended by a brake operation due to a cutting-in by another vehicle in spite of the fact that the driver originally desires the inertia travel control, the vehicle control apparatus according to the present invention can prevent the inertia travel control from being prohibited in the section inclusive of the current position.

The vehicle control apparatus according to the present invention may preferably be so constructed that the drive operation detecting unit detects an operation amount of at least one of an accelerator pedal, a brake pedal, and a steering wheel.

By the construction as set forth in the above definition, the vehicle control apparatus according to the present invention can determine whether or not there is the driving operation by the driver for the suspension of the inertia travel control, based on an operation amount of the accelerator pedal, brake pedal and the steering wheel by the driver. Therefore, the vehicle control apparatus according to the present invention can prohibit the performance of the inertia travel control afterwards in the section which the driver does not desire the inertia travel control.

The vehicle control apparatus according to the present invention may preferably be so constructed that the road status includes at least either one of an inclination of the road and a curvature of the road.

By the construction as set forth in the above definition, the vehicle control apparatus according to the present invention can prohibit the performance of the inertia travel based on the inclination and the curvature of the road that influence on whether or not the driver feels a sense of discomfort.

The vehicle control apparatus according to the present invention may preferably be so constructed that the inertia travel prohibition unit cancels a prohibition of the inertia travel of the vehicle in the predetermined section inclusive of the current position in a case that the driving operation to start the inertia travel is detected while the inertia travel is being prohibited.

By the construction as set forth in the above definition, the vehicle control apparatus according to the present invention can cancel the prohibition of the inertia travel control so that the inertia travel control in the section can be resumed, in a case that there is a driver's operation by the driver to desire the inertia travel control in the section wherein the inertia travel control was prohibited due to the driving operation in the past.

The vehicle control apparatus according to the present invention may preferably be so constructed that the inertia travel prohibition unit stores an inertia travel duration in the predetermined section inclusive of the current position in the road information storing unit when the inertia travel is suspended, and prohibits the inertia travel in the predetermined section inclusive of the current position in the case that an average value of a plurality of the stored inertia travel durations is equal to or smaller than a predetermined value.

By the construction as set forth in the above definition, when an average value of a plurality of inertia travel control continuation times associated with the current position is equal to or smaller than a predetermined value, there is a possibility in the vehicle control apparatus according to the present invention that the gasoline mileage is deteriorated in a case that the inertia travel control is performed only for a short period of time in the section inclusive of the current position compared to a case that the inertia travel control is not performed at all in the same section. For this reason, the vehicle control apparatus according to the present invention can prohibit the inertia travel control in the section inclusive of the current position, so that the gasoline mileage of the vehicle is not deteriorated.

The vehicle control apparatus according to the present invention may preferably be so constructed that the inertia travel unit terminates the inertia travel when the inertia travel unit judges that a travelling state of the vehicle does not satisfy a predetermined condition for allowing the vehicle to travel in the inertia travel.

By the construction as set forth in the above definition, the vehicle control apparatus according to the present invention can terminate the inertia travel in accordance with the travelling state of the vehicle. Therefore, the vehicle control apparatus according to the present invention can terminate the inertia travel before the driver feels a sense of discomfort and performs the driving operation to suspend the inertia travel.

The vehicle control apparatus according to the present invention may preferably be so constructed that the power source is constituted by an internal combustion engine, the vehicle has a transmission arranged between the internal combustion engine and the driving wheels, and the inertia travel unit stops the transmission of the driving power to the driving wheels by the transmission, to have the vehicle travel in the inertia travel.

By the construction as set forth in the above definition, the vehicle control apparatus according to the present invention can perform or not perform the inertia travel based on whether or not the gear stage of the transmission is in a neutral state in the vehicle having provided therein with the internal combustion engine as a power source.

The vehicle control apparatus according to the present invention may preferably be so constructed that the power source is constituted by an internal combustion engine and an electric motor that can be regenerated during a non-driving period of the vehicle, and the inertia travel unit stops the regeneration by the electric motor during the non-driving period, to have the vehicle travel in the inertia travel.

By the construction as set forth in the above definition, the vehicle control apparatus according to the present invention can perform or not perform the inertia travel in accordance with the travel state or driving state of the vehicle, in the hybrid vehicle as well which has provided therein with the internal combustion engine and the electric motor as power sources. Therefore, the vehicle control apparatus according to the present invention can prevent such a phenomenon that the actual braking distance is shorter than the desired braking distance due to the performance of the regeneration, so that the driver operates the accelerator pedal, thereby causing the gasoline mileage to be deteriorated.

Advantageous Effects of Invention

The present invention can provide a vehicle control apparatus which can improve the gasoline mileage without imparting the sense of discomfort to the driver.

BRIEF DESCRIPTION OF DRAWINGS

FIG. 3 is an operation table of the automatic transmission according to the embodiment of the present invention.

DESCRIPTION OF EMBODIMENTS

The preferred embodiment of a vehicle control apparatus according to the present invention will be described hereinafter with reference to FIGS. 1 to 8. First, the construction of the vehicle control apparatus according to the present invention will be explained hereinafter.

In the present embodiment of the vehicle control apparatus, explanation will be given about a case in which the vehicle control apparatus according to the present invention is applied to a Front engine Rear drive (hereinafter simply referred to as FR) vehicle with an automatic transmission mounted thereon.

Figure 1:
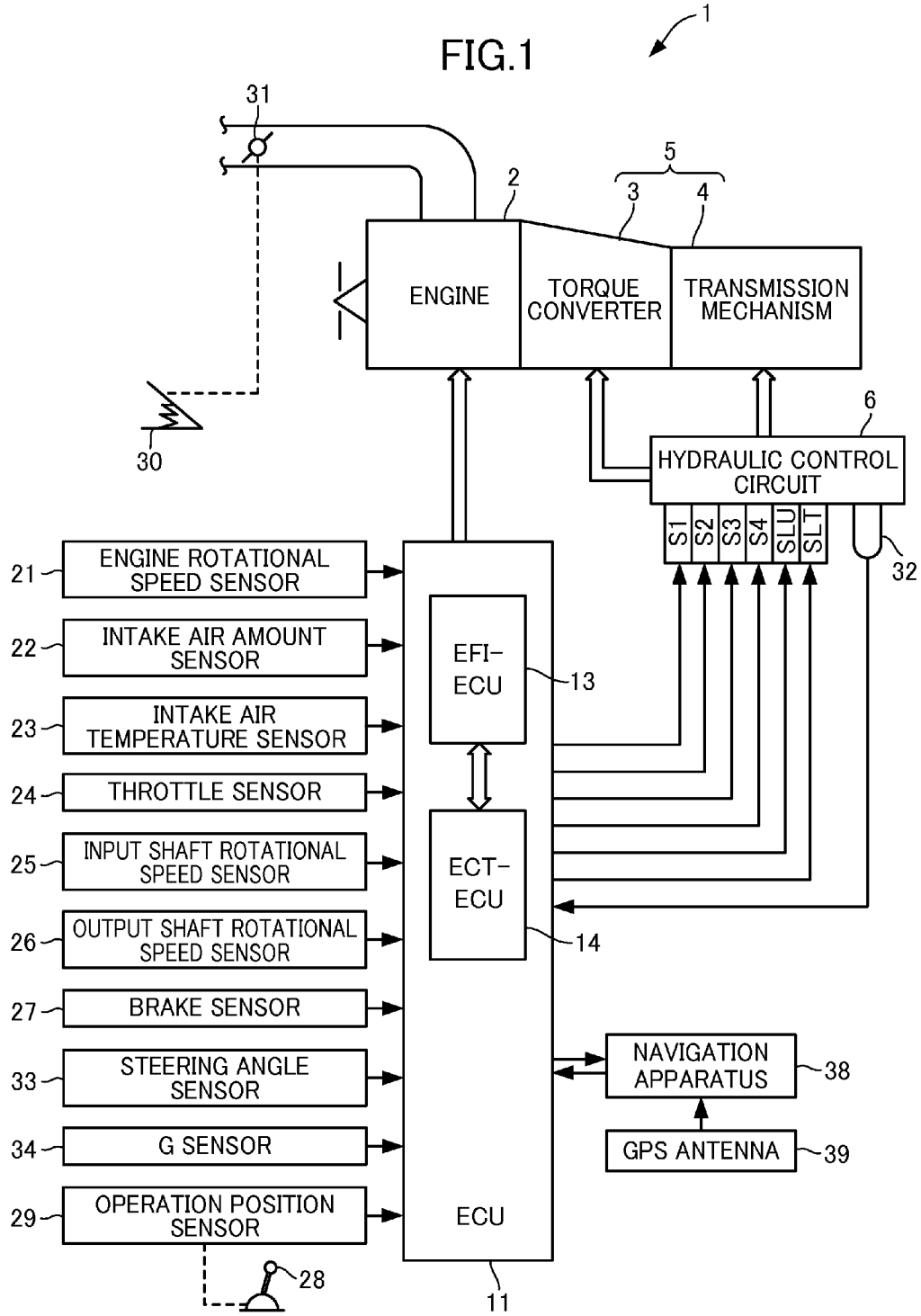
FIG. 1 is a schematic diagram showing a vehicle mounted thereon with the vehicle control apparatus according to the embodiment of the present invention.
Figure 2:
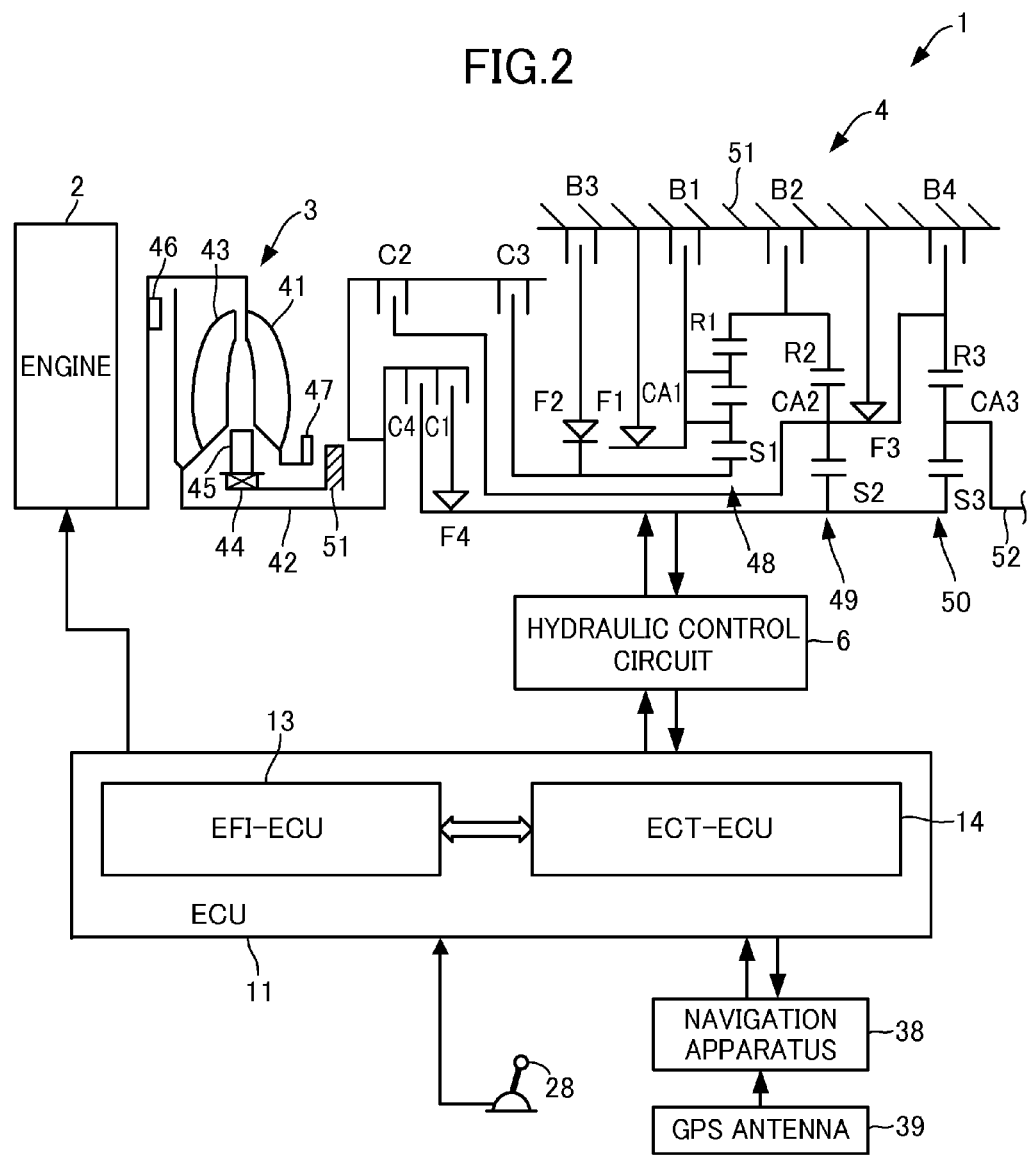
FIG. 2 is a schematic of a structure of the vehicle control apparatus according to the embodiment of the present invention.

As shown in FIGS. 1, 2, a vehicle 1 is provided therein with an engine 2, a torque converter 3 that increases a rotational torque outputted by the engine 2, a transmission mechanism 4 that varies a rotational speed of an output shaft of the torque converter 3 to output the rotational torque with a varied rotational speed, wherein the rotational torque outputted from the transmission mechanism 4 is adapted to be transmitted to driving wheels through a differential gear not shown.

The engine 2 is constituted by a known internal combustion engine that outputs driving power by combusting a fuel such as gasoline or light oil. Further, the torque converter 3 and the transmission mechanism 4 collectively constitute the automatic transmission 5.

The torque converter 3, disposed between the engine 2 and the transmission mechanism 4, is provided therein with a pump blade wheel 41 connected with the engine 2, a turbine blade wheel 43 connected with an input shaft 42 of the transmission mechanism 4, and a stator blade wheel 45 having rotation in one direction prevented by a one-way clutch 44. The pump blade wheel 41 and the turbine blade wheel 43 are adapted to transmit the driving power through a fluid body.

Furthermore, the torque converter 3 is provided therein with a lock-up clutch 46 for directly fixing the pump blade wheel 41 and the turbine blade wheel 43 with respect to each other, so that the pump blade wheel 41 and the turbine blade wheel 43 are mechanically and directly connected with respect to each other by a hydraulic oil, thereby raising a transmission efficiency of a transmission of driving power from the engine 2 to the transmission mechanism 4. The torque converter 3 is capable also of slipping the lock-up clutch 46 at a predetermined slipping ratio.

Still further, the pump blade wheel 41 is provided therein with a mechanically driven oil pump 47 operative to generate an oil pressure for controlling the speed variation of the transmission mechanism 4 and an oil pressure for supplying lubrication oil to various parts of the vehicle 1.

The transmission mechanism 4 is provided therein with a first planetary gear device 48 of double-pinion type, a second planetary gear device 49 of single-pinion type, and a third planetary gear device 50 of single-pinion type. The first planetary gear device 48 has a sun gear 51 which can be connected with the input shaft 42 through a clutch C3 and can be connected with the housing 51 through a one-way clutch F2 and a brake B3. Further, the sun gear 51 is prevented from being rotated in a direction opposite from a rotational direction of the input shaft 42.

The first planetary gear device 48 has a carrier CA1 which can be connected with the housing 51 through a brake B1. Further, the carrier CA1 is constantly prevented from being rotated in a direction opposite from a rotational direction of the input shaft 42 by a one-way clutch F1 arranged in parallel with the brake B1.

The first planetary gear device 48 has a ring gear R1 and the second planetary gear device 49 has a ring gear R2, the ring gear R1 being connected with the ring gear R2 and connectable with the housing 51 through a break B2. The second planetary gear device 49 has a sun gear S2 and the third planetary gear device 50 has a sun gear S3, the sun gear S2 being connected with the sun gear S3 and connectable with the input shaft 42 through a clutch C4. The sun gear S2 is connectable with the input shaft 42 through a one-way clutch F4 and the clutch C1 and is prevented from being rotated in a direction opposite from a rotational direction of the input shaft 42.

The second planetary gear device 49 has a carrier CA2 and the third planetary gear device 50 has a ring gar R3, the carrier CA2 being connected with the ring gear R3, connectable with the input shaft 42 through a clutch C2, and connectable with the housing 51 through a brake B4. The carrier CA2 is prevented from being rotated in a direction opposite from a rotational direction of the input shaft 42 by a one-way clutch F3 disposed in parallel with the brake B4. Further, the third planetary gear device 50 has a carrier CA3, which is connected with the output shaft 52.

The clutches C1-C4 and the brakes B1-B4 (hereinafter simply referred to as clutch C or brake B, unless otherwise distinguished) are respectively constituted by a hydraulic friction engagement device such as a multi-plate clutch or a multi-plat brake that is controlled of engagement by a hydraulic actuator. The clutch C and the brake B are adapted to take either one of engagement state or disengagement state in accordance with a hydraulic circuit switched by excited/non-excited state of transmission solenoids S1-S4 in hydraulic control circuit 6 to be described later and linear solenoids SLT, SLU or an operating state of a manual valve not shown. Therefore, as shown in FIG. 3, the transmission mechanism 4 is adapted to take a transmission stage in accordance with a combination of engagement/disengagement state of the clutch C and the brake B. The transmission mechanism 4 according to the present embodiment is adapted to take either one of transmission stages constituted by six forward transmission stages 1-6, and one backward transmission stage. Further, the transmission mechanism 4 can have all of the clutch C and all of the brake B take the disengagement state, so that the transmission mechanism 4 takes a neutral state in which transmission of driving power from the engine 2 to the driving wheels is intercepted.

The vehicle 1 is further provided therein with a hydraulic control circuit 6 for controlling an increase ratio of torque by the torque converter 3 and the transmission stage of the transmission mechanism 4 by oil pressure. The hydraulic control circuit 6 is provided therein with an AT oil temperature sensor 32 for measuring oil temperature of the transmission solenoid S1-S4, the liner solenoids SLT, SLU and the operating oil.

The vehicle 1 is provided therein with an ECU 11 for controlling fuel injection in the engine 2 and gear shift in the automatic transmission 5, an engine rotational speed sensor 21 for measuring the rotational speed of the engine 2, an intake air amount sensor 22 for measuring an intake air amount of the engine 2, an intake air temperature sensor 23 for measuring an intake air temperature of the engine 2, a throttle sensor 24 for measuring an opening degree of a throttle valve 31, an input shaft rotational speed sensor 25 for detecting a rotational speed of an input shaft 42 of the transmission mechanism 4, an output shaft rotational speed sensor 26 for detecting a rotational speed of an output shaft 52 of the transmission mechanism 4 and a brake sensor 27 for measuring a depressing force of a brake pedal. The vehicle 1 is further provided therein with a shift lever 28, an operation position sensor 29 for detecting a position of the shift lever 28, an accelerator opening degree sensor 30 for detecting an accelerator opening degree and a steering angle sensor 33.

The engine rotational speed sensor 21 is adapted to measure the rotational speed of the engine 2 based on a rotational speed of a crank shaft not shown, to output a signal indicative of the rotational speed of the engine 2 to an electronic control unit (hereinafter simply referred to as "ECU") 11 to be explained hereinafter.

The throttle sensor 24 is constituted by a hall element capable of obtaining an output voltage in accordance with a throttle opening degree of the throttle valve 31, so that a signal indicative of the throttle opening degree to the ECU 11 to be explained hereinafter. The input shaft rotational speed sensor 25 is adapted to output a signal indicative of the rotational speed of the input shaft of the transmission mechanism 4 to the ECU 11 to be explained hereinafter.

The output shaft rotational speed sensor 26 is adapted to output a signal indicative of the rotational speed of the output shaft of the transmission mechanism 4 to the ECU 11 to be explained hereinafter. The operation position sensor 29 is adapted to detect an operation position of the shift lever 28 operated by a driver.

The brake sensor 27 is adapted to measure a variation of a pressure in a master cylinder in response to a depressing power of a driver against the brake pedal and an operation stroke, so that a brake depression power signal indicative of the measured depression power to the ECU 11.

The accelerator opening degree sensor 30 is constructed by an electronic position sensor employing a hall element, and is adapted to output a signal indicative of a position of the accelerator pedal, i.e., the accelerator opening degree to the ECU 11, in response to an operation of the accelerator pedal mounted on the vehicle 1 by the driver.

The steering angle sensor 33 is adapted to detect a steering torque of a steering shaft connected to a steering wheel, and to output a signal indicative of the steering toque to the ECU 11. The ECU 11 is adapted to calculate a steering amount in a left direction and in a right direction based on the signal inputted from the steering angle sensor 33.

Further, the vehicle 1 is provided therein with a navigation apparatus 38. The navigation apparatus 38 is adapted to receive signals transmitted from a plurality of GPS satellites through a GPS antenna 39 to determine a current position of the vehicle 1, thereby transmitting a road information of the road ahead of the vehicle 1, selected from road informations preliminarily stored therein, and the current position of the vehicle 1 to the ECU 11. The road information is stored in association with the road status including the inclination and the curvature and the like of the road. The ECU 11 is adapted to calculate the inclination and the curvature of the road ahead of the vehicle 1 based on the road information associated with the road status and the current position information.

The ECU 11 is connected with the engine rotational speed sensor 21, the intake air amount sensor 22, the intake air temperature sensor 23, the throttle sensor 24, the input shaft rotational speed sensor 25, the output shaft rotational speed sensor 26, the brake sensor 27, the operation position sensor 29 and the AT oil temperature sensor 32, and is adapted to input signals respectively indicative of the engine rotational speed, the intake air amount, the intake air temperature, the throttle opening degree, the input shaft rotational speed, the output shaft rotational speed, the depressing force of the brake pedal, the operation position of the shift lever 28 and the AT oil temperature. The ECU 11 is adapted to perform engine control by an EFI-ECU 13 and gear shift control by an ECT-ECU 14 based on the informations inputted from the sensors and a gear shift map representing a gear shift chart.

The ECU 11 is provided therein with an Electronic Fuel Injection—Electronic Control Unit (hereinafter simply referred to as EFI-ECU) 13 that controls the engine 2 and an Electronic Controlled Automatic Transmission (hereinafter simply referred to as ECT)-ECU 14 that controls the automatic transmission 5. The ECU 11 may further be provided therein with a plurality of ECUs not shown such as a brake ECU to control the brake of the vehicle 1. In the present embodiment, the ECU 11 constitutes a control unit according to the present invention.

The EFI-ECU 13 is equipped therein with a Central Processing Unit (hereinafter simply referred to as CPU), a Random Access Memory (hereinafter simply referred to as RAM), a Read Only Memory (hereinafter simply referred to as ROM) and an input/output interface, which are not shown, and is adapted to output an engine control signal to the engine 2, so that the engine 2 is controlled according to an operation amount of the accelerator pedal.

The ECT-ECU 14 is equipped therein with a CPU, a RAM, a ROM and an input/output interface, which are not shown, and is adapted to control the hydraulic control circuit 6, so that the torque converter 3 and a gear shift stage of the automatic transmission 5 are controlled based on the signals inputted. Further, the ROM has stored therein with a program to perform the gear shift control and the like.

The shift lever 28 is adapted to take, for example, a D position corresponding to a drive range, an N position corresponding to a neutral range, an R position corresponding to a reverse range and a P position corresponding to a parking range, arranged in a sequence from a rear side to a front side of the vehicle 1, so that the position is shifted in accordance with a gate pattern.

The shift lever 28 is further adapted to take an S position representing a manual position for shifting a speed variation range of the automatic transmission 5 in a manual transmission mode, a plus position (hereinafter simply referred to as + position) instructing a shift up and a minus position (hereinafter simply referred to as – position) instructing a shift down.

The S position is juxtaposed with the D position, so that the shift lever 28 is retained in the S position by function of a spring not shown, in response to the shift lever 28 being laterally shifted from the D position by the driver.

The ECU 11 is adapted to materialize a sequential shift wherein the gear shift range is shifted from the current gear shift range to one upper gear shift range or one lower gear shift range, respectively in response to the shift lever 28 being shifted to the + position and the – position.

The ECU 11 is adapted to move to the automatic transmission mode when the ECU 11 acquires from the operation position sensor 29 an information that the shift lever 28 is positioned at the D position. In the automatic transmission mode, the gear shift stages of the automatic transmission 5 can be shifted through the hydraulic pressure control circuit 6 in accordance with the vehicle speed, the throttle opening degree and the gear shift map. When, on the other hand, the ECU 11 acquires from the operation position sensor 29 an information that the shift lever 28 is positioned at the S position, the ECU 11 is adapted to move to the manual transmission mode in which the gear shift stages of the automatic transmission 5 can be shifted in response to the gear shift range request by the driver.

The ECU 11 according to the present embodiment is adapted to have the gear stage shifted to the neutral position in accordance with a travelling state of the vehicle 1 to perform a neutral inertia travel control (hereinafter simply referred to as N inertia travel control) in which the vehicle 1 travels by an inertia for improvement of gasoline mileage.

The ECU 11 is adapted to have the gear stage of the automatic transmission 5 shifted to the neutral position through the hydraulic control circuit 6, in a case that the vehicle 1 is not set neither to a manual transmission mode nor to a power mode wherein an output with respect to the accelerator pedal is increased than usual and the travelling state of the vehicle 1 satisfies all of the first to the third conditions to be explained hereinafter.

To be more specific, the first condition is defined as, that the ECU 11 determines that neither the accelerator pedal nor the brake pedal is not depressed based on the signals inputted from the accelerator opening degree sensor 30 and the brake sensor 27 and that steering amount of the steering wheel not shown in the left or the right direction is equal to or smaller than a predetermined value based on the signal inputted from the steering angle sensor 33.

The second condition is defined as, that the ECU 11 determines that gravity acted upon the vehicle 1 in response to a turning state of the vehicle 1 and the inclination of the road is equal to or smaller than a predetermined value based on a signal inputted from a G sensor 34.

The third condition is defined as, that the ECU 11 obtains information indicative of the curvature and the inclination of the road ahead of the vehicle 1 based on the signal inputted by the navigation apparatus 38, and determines that the curvature and the inclination are equal to or smaller than a predetermined value.

The ECU 11 is adapted to start the N inertia travel control and shift the gear stage of the automatic transmission 5 to the neutral position, when all of the first to the third conditions are satisfied.

Further, the ECU 11 is adapted to determine that a stop condition of the N inertia travel control is satisfied and terminate the N inertia travel control, when at least any one of the first to the third conditions is not satisfied.

For example, the driver is anticipated to depress the brake pedal when the sight ahead is not good so that the driver does not desire to continue the N inertia travel, even if the curvature and the inclination of the road ahead satisfy the third condition. However, in conventional vehicle control apparatuses, when the vehicle arrives at the same position again, all of the first to the third conditions are satisfied, so that the N inertia travel control is started, with the result that the driver feels a discomfort against the N inertia travel every time the vehicle arrives at the same position.

To solve the aforementioned problem, the ECU 11 according to the present embodiment is adapted to perform an N inertia travel prohibition learning control, so that the N inertia travel control is suppressed from being performed at the same position thereafter, when there is any one of the conditions explained hereinafter being satisfied, such as that the brake pedal is depressed by the driver during the N inertia travel control.

More specifically, the ECU 11 has the road information constituting a map information stored in the navigation apparatus 38. The road information constitutes a database that can store a section in association with information such as a vehicle speed information, the section being one of the sections as a result of dividing the road into sections. The ECU 11 is adapted to store a predetermined section, inclusive of the current position of the vehicle 1, in association of information indicative of prohibition of the N inertia travel. The section may, for example, be constituted by a link that links one node with an adjacent node, wherein each of the nodes is set per each 100 m along the road on the map information.

The ECU 11 is adapted to obtain the road information of the current position from the navigation apparatus 38 during a travelling of the vehicle 1, and to determine whether or not the information indicative of prohibition of the N inertia travel is associated with the section inclusive of the current position of the vehicle 1. The ECU 11 is adapted to prohibit a start of the N inertia travel control even if the starting conditions for the N inertia travel control are satisfied, when determines that the information indicative of prohibition of the N inertia travel is associated with the section.

As a first aspect of the N inertia travel prohibition learning control, the ECU 11 is adapted to perform an N inertia travel prohibition learning, when the driver performs a driving operation with a sense of discomfort, as a first aspect of the N inertia travel prohibition learning control.

To be more specific, the ECU 11 suspends the N inertia travel control and have an information indicative of the current position and a current vehicle speed stored in the navigation apparatus 38 in association with the section inclusive of the current position on the road information, when the ECU 11 detects a fact that the accelerator pedal or the brake pedal is depressed by the driver during the N inertia travel control being performed.

There can be an incident that the driver depresses the brake pedal in response to another vehicle appearing from a side way by any chance during the N inertia travel control being performed by the ECU 11. In this incident, the ECU 11 needs to avoid storing the section as the N inertia travel prohibition section, for the driver does not originally desire an N inertia travel prohibition in the section. Therefore, the ECU 11 is adapted to store the section as the N inertia travel prohibition section, on the condition that there are a predetermined number of or more incidents that the brake pedal or accelerator pedal is operated by the driver when the vehicle 1 is travelling in the same section at a similar vehicle speed.

The ECU 11 may preferable be adapted to have a number of cases in each of the section stored in the navigation apparatus 38, the cases being such cases in which the brake pedal and accelerator pedal are not operated by the driver so that the N inertia travel control is continued, and to store the section as an N inertia travel control prohibition section, on the condition that there are a predetermined ratio of or more incidents that the brake pedal or accelerator pedal is operated by the driver.

As a second aspect of the N inertia travel prohibition learning control, the ECU 11 is adapted to perform the N inertia travel prohibition learning in a case where the gasoline mileage is deteriorated, contrary to an expectation, compared with a case that the N inertia travel control is not performed due to a shortened continuation time of the N inertia travel control, when the N inertia travel control is suspended due to the driving operation during the N inertia travel control being performed.

Even in this case, there can be an incident that the driver depresses the brake pedal in response to another vehicle appearing from a side way by any chance during the N inertia travel control being performed by the ECU 11. Therefore, the ECU 11 is adapted to store in the navigation system 38 the section as the N inertia travel prohibition section, on the condition that an average of the N inertia travel time is shorter than a predetermined value so that there is a higher possibility that the gasoline mileage is deteriorated by performing the N inertia travel control in the section, when the vehicle is travelling in the same section at a similar vehicle speed.

Figure 4:
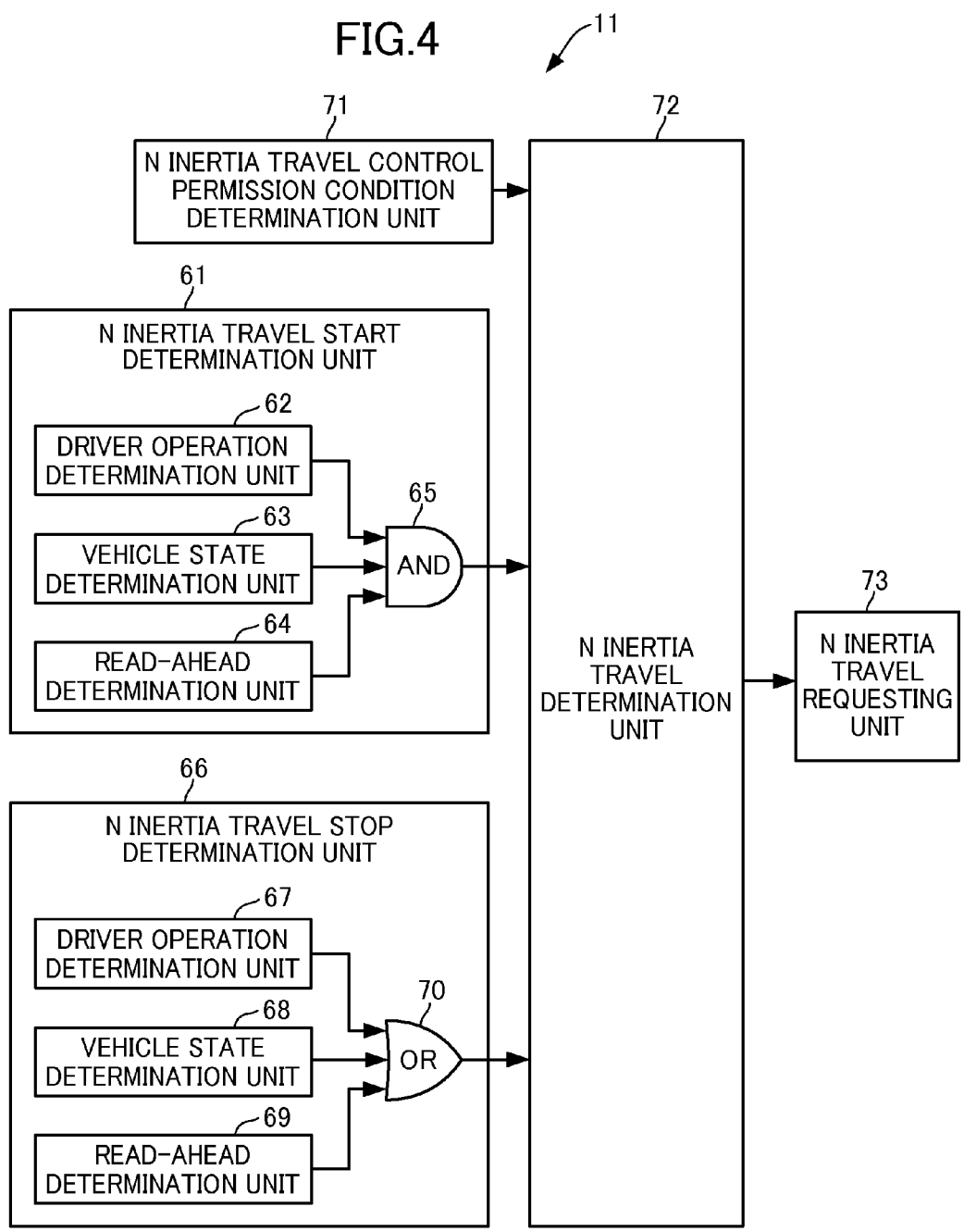
FIG. 4 is a block diagram of the vehicle control apparatus according to the embodiment of the present invention.

FIG. 4 is a block diagram explaining an essential portion of the N inertia travel control function by the ECU 11. The ECU 11 is provided therein with an N inertia travel start determination unit 61 for determining the N inertia travel start condition, an N inertia travel stop determination unit 66 for determining the N inertia travel stop condition, an N inertia travel control permission condition determination unit 71 for determining whether or not a travel mode of the vehicle 1 or the like is a mode in which performance of the N inertia travel is permitted, an N inertia travel determination unit 72 for determining performance or stop of the N inertia travel and an N inertia travel requesting unit 73 for requesting an N inertia travel when the N inertia travel determination unit 72 determines the performance of the N inertia travel.

The N inertia travel start determination unit 61 is provided therein with a driver operation determination unit 62 that determines whether or not the operation by the driver satisfies a condition for performing the N inertia travel control, a vehicle state determination unit 63 that determines whether or not a travel state of the vehicle 1 satisfies a condition for performing the N inertia travel control, a read-ahead determination unit 64 that determines whether or not the inclination and the curvature of the road ahead of the position at which the vehicle 1 is currently travelling satisfy a condition for performing the N inertia travel control based on an information obtained from the navigation apparatus 38, and a logical AND performance unit 65 that performs a logical AND operation on the determination results of the driver operation determination unit 62, the vehicle state determination unit 63 and the read-ahead determination unit 64.

The N inertia travel stop determination unit 66 is provided therein with a driver operation determination unit 67 that determines whether or not the operation by the driver satisfies a condition for performance of the N inertia travel control, a vehicle state determination unit 68 that determines whether or not a travel state of the vehicle 1 satisfies a condition for stopping the N inertia travel control, a read-ahead determination unit 69 that determines whether or not the inclination and the curvature of the road ahead of the position at which the vehicle 1 is currently travelling satisfy a condition for stopping the N inertia travel control based on an information obtained from the navigation apparatus 38, and a logical OR performance unit 70 that performs a logical OR operation on the determination results of the driver operation determination unit 67, the vehicle state determination unit 68 and the read-ahead determination unit 69.

Accordingly, the N inertia travel determination unit 72 starts the N inertia travel control on the condition that the condition for performing the N inertia travel control is determined to be satisfied by the N inertia travel control permission condition determination unit 71, in a case that the condition for performing the N inertia travel control is determined to be satisfied by all of the driver operation determination unit 62, the vehicle state determination unit 63 and the read-ahead determination unit 64. On the other hand, the N inertia travel determination unit 72 stops the N inertia travel control in a case that the condition for stopping the N inertia travel control is determined to be satisfied by either one of the driver operation determination unit 67, the vehicle state determination unit 68 and the read-ahead determination unit 69.

Figure 5:
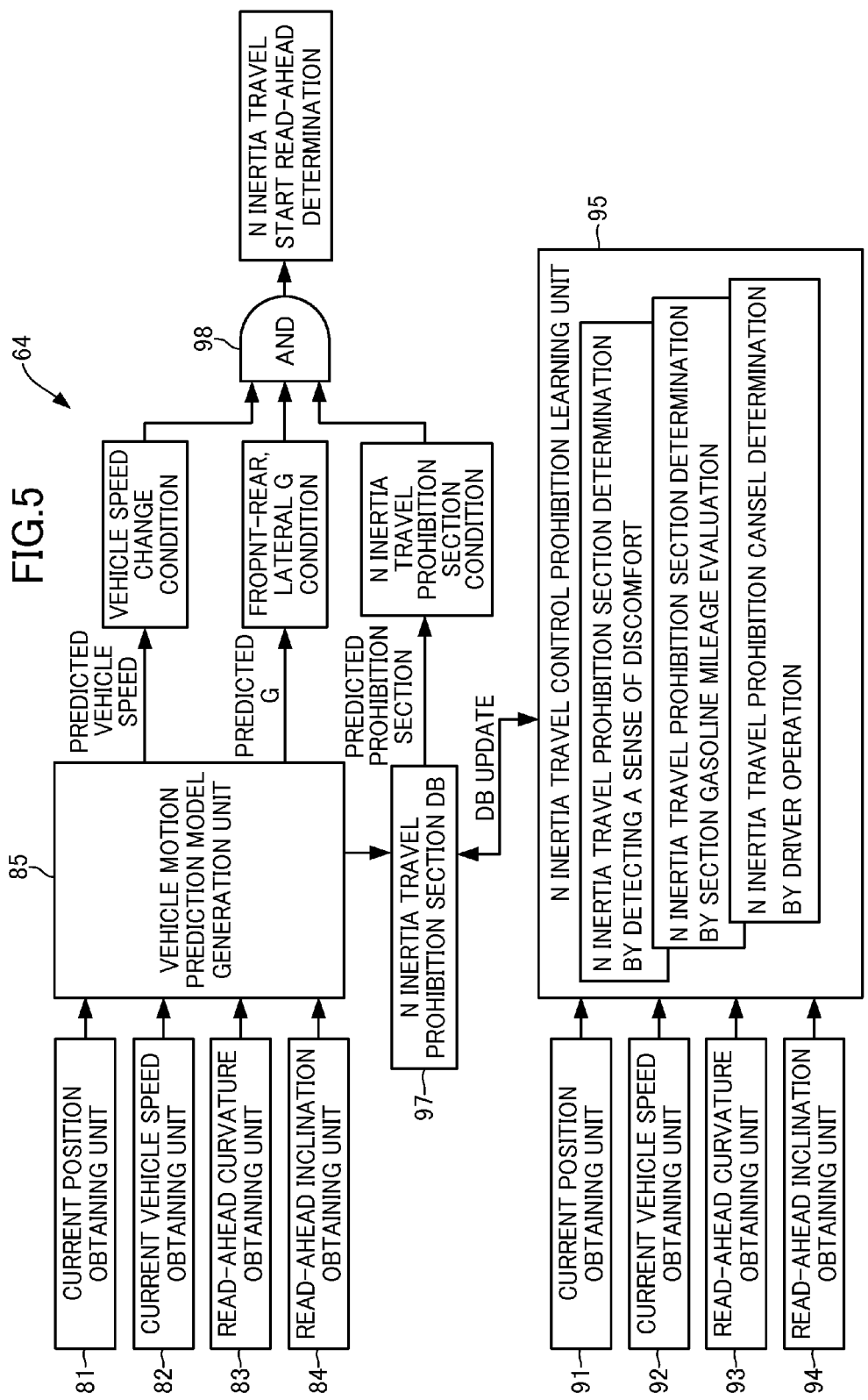
FIG. 5 is a block diagram of the vehicle control apparatus according to the embodiment of the present invention.

FIG. 5 is a block diagram for explaining the function of the read-ahead determination unit 64 in the N inertia travel start determination unit 61 as shown in FIG. 4.

The read-ahead determination unit 64 is provided therein with a current position obtaining unit 81 for obtaining the current position of the vehicle 1, a current vehicle speed obtaining unit 82 for obtaining the current vehicle speed of the vehicle 1, a read-ahead curvature obtaining unit 83 for obtaining from the road information the curvature of the unit ahead of the position at which the vehicle 1 is currently travelling and a read-ahead inclination obtaining unit 84 for obtaining from the road information the inclination of the section ahead of the position at which the vehicle 1 is currently travelling.

Further, the read-ahead determination unit 64 is provided therein with a vehicle motion prediction model generation unit 85 adapted to perform a motion prediction of the vehicle 1 based on the informations obtained respectively by the current position obtaining unit 81, the current vehicle speed obtaining unit 82, the read-ahead curvature obtaining unit 83 and the read-ahead inclination obtaining unit 84. The vehicle motion prediction model generation unit 85, for example, is adapted to preliminarily store an equation of motion according to specifications of the vehicle 1, and to substitute into the equation of motion the informations obtained respectively by the current position obtaining unit 81, the current vehicle speed obtaining unit 82, the read-ahead curvature obtaining unit 83 and the read-ahead inclination obtaining unit 84, thereby to predict a vehicle speed variation and an acceleration of the vehicle 1 in a fore-aft direction and a lateral direction.

Furthermore, the read-ahead determination unit 64 is provided therein with an N inertia travel control prohibition learning unit 95. The N inertia travel control prohibition learning unit 95 is adapted to obtain a current position information, a current vehicle speed, a read-ahead curvature information and a read-ahead inclination information from a current position obtaining unit 91, a current vehicle speed obtaining unit 92, a read-ahead curvature obtaining unit 93 and a read-ahead inclination obtaining unit 94, respectively. Here, the current position obtaining unit 91, the current vehicle speed obtaining unit 92, the read-ahead curvature obtaining unit 93 and the read-ahead inclination obtaining unit 94 may be constituted by the current position obtaining unit 81, the current vehicle speed obtaining unit 82, the read-ahead curvature obtaining unit 83 and the read-ahead inclination obtaining unit 84, respectively.

The N inertia travel control prohibition learning unit 95 is adapted to update a N inertia travel prohibition section DB 97 to be described hereinafter, based on the current position information, the current vehicle speed information, the read-ahead curvature information and the read-ahead inclination information, and whether or not the driver performed the driving operation indicative of a fact that the driver felt a discomfort due to a start of the N inertia travel control, whether or not the gasoline mileage is deteriorated contrary to expectation by performing the N inertia travel control rather than performing another travel control such as a fuel cut control or a deceleration flex lock up control, and whether or not the driving operation is detected indicative of a fact that the driver desired the N inertia travel control, such a fact that the driver selected an N range in the N inertia travel prohibition section.

The read-ahead determination unit 64 is provided therein with the N inertia travel prohibition section DB 97, which is a database of the N inertia prohibition sections associated with the road informations. The N inertia travel control prohibition learning unit 95 stores in the N inertia travel prohibition section DB 97 the section inclusive of a current travelling position as the N inertia travel prohibition section, in a case that the N inertia travel control at the current travelling position is determined to be prohibited. The N inertia prohibition section DB 97 constitutes a part of a learning DB to be described hereinafter.

The read-ahead determination unit 64 is adapted to have an AND circuit 98 inputted with a vehicle speed variation condition predicted by the vehicle motion prediction model generation unit 85, an acceleration condition of the vehicle 1 in the fore-aft direction and the lateral direction and an N inertia travel prohibition section condition stored in the N inertia travel prohibition section DB 97, thereby to determine that the N inertia travel start condition is satisfied, when all of the conditions satisfy the N inertia travel start condition.

Next, an operation of an N inertia travel prohibition learning control will be explained hereinafter. First, the N inertia travel prohibition learning control based on a detection of a discomfort will be explained with reference to FIG. 6. The operation explained hereinafter is realized by a program preliminarily stored in the ROM of the ECU 11, the program being executed by the CPU in a predetermined time interval. Here, an exemplary case will be explained wherein the N inertia travel control is suspended du to the brake pedal being depressed by the driver.

Figure 6:
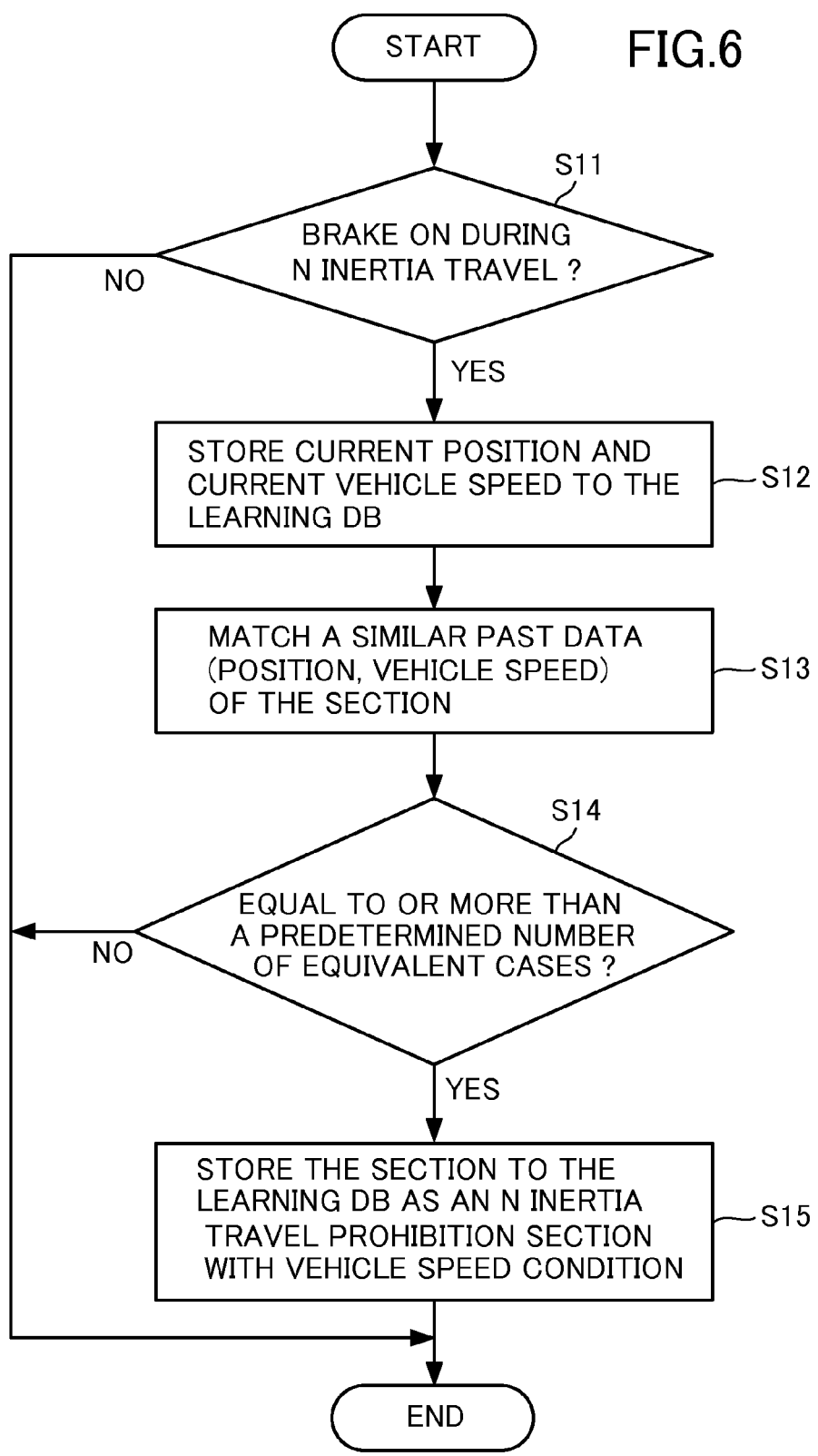
FIG. 6 is a flow chart of the N inertia travel prohibition learning control according to the embodiment of the present invention.

As shown in FIG. 6, first, the ECU 11 determines whether or not the brake is ON, i.e., in a state that the brake pedal is depressed by the driver (Step S11).

The ECU 11 has an N inertia travel flag indicative of a state of the N inertia travel control, the N inertia travel flag being turned ON during the N inertia travel control is being performed. Accordingly, the ECU 11 determines whether or not the vehicle 1 is performing the N inertia travel control with reference to the N inertia travel flag.

The ECU 11 determines that the brake is ON in a case that the brake pedal is being depressed based on the signal inputted from the brake sensor 27.

When the ECU 11 determines that the brake is turned ON during the N inertia travel control is being performed ("YES" in Step S11), the ECU 11 moves to the Step S12. On the other hand, when the ECU 11 determines that the N inertia travel control is not being performed or the brake is not turned ON ("NO" in Step S11), the ECU 11 moves to END.

In the step S12, the ECU 11 stores the current position and the current vehicle speed in the learning DB. More specifically, the ECU 11 associates the information indicative of the current position and the current vehicle speed with the section inclusive of the current position in the road information stored in the navigation apparatus 38.

Next, the ECU 11 matches the data of the current position and the current vehicle speed stored this time with a similar data, with reference to the information associated with the section inclusive of the current position (Step S13). The similar data refers to a data, stored in the learning DB, indicative of the fact, for example, that a difference of the vehicle speed with respect to the current vehicle speed is equal to or less than a predetermined value and that the position is in the same section and the distance of the position from the current position is equal to or shorter than a predetermined value.

Then, the ECU 11 determines whether or not, as a result of the data matching at the step S13, there are equal to or more than a predetermined number of equivalent cases indicative of a state, i.e., the position and the vehicle speed at which the N inertia travel control was suspended (Step S14). When the ECU 11 determines that there are equal to or more than the predetermined number of equivalent cases ("YES" in step S14), the ECU 11 moves to the step S15. The predetermined number refers to a number, for example 3, which is sufficient to exclude incidents that the driver applied the brake by any chance in a road status in which the driver originally desires the N inertia travel. On the other hand, when the ECU 11 determines that there are less than the predetermined number of equivalent cases ("NO" in step S14), the ECU 11 moves to END.

When the ECU 11 moves to the step S15, the ECU 11 sets the section referenced in the step S12 as the N inertia travel prohibition section. In the present embodiment, the ECU 11 sets a flag ON indicative of the N inertia travel prohibition associated with the section in the road information.

Figure 7:
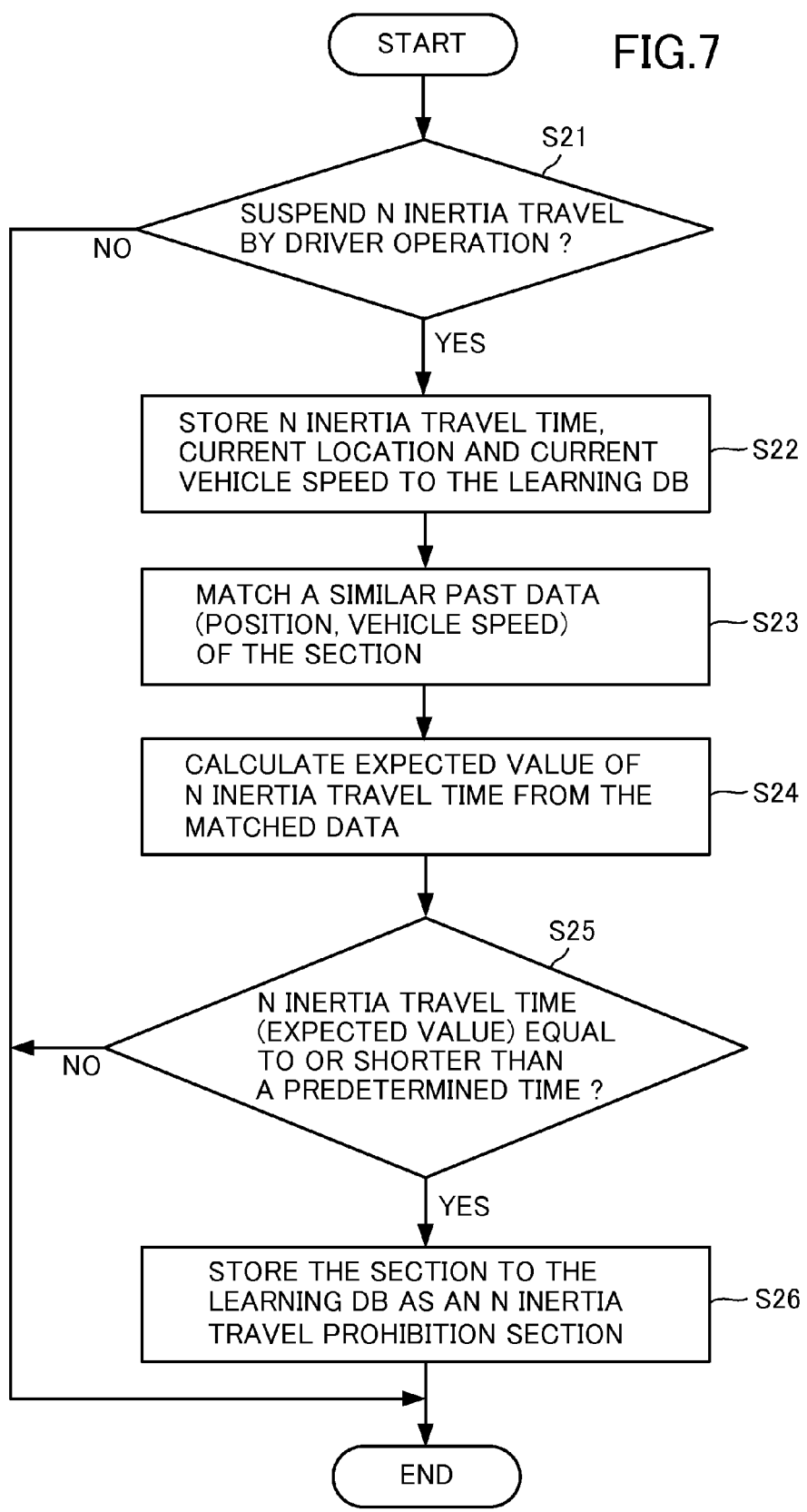
FIG. 7 is a flow chart of the N inertia travel prohibition learning control according to the embodiment of the present invention.

Next, an N inertial travel prohibition learning control will be explained with reference to FIG. 7. The process explained hereinafter is realized by a program preliminarily stored in the ROM of the ECU 11, and executed by the CPU at a predetermined time interval.

The ECU 11 determines whether or not the N inertia travel is suspended by the driving operation of the driver (Step S21). To be specific, the ECU 11 is adapted to determine whether or not the condition for suspending the N inertia travel, such as that the brake pedal or the accelerator pedal is depressed or that the steering angle is equal to or larger than a predetermined value, is satisfied, based on the signals inputted from the brake sensor 27, the operation position sensor 29 or the steering angle sensor 33.

When the ECU 11 determines that the N inertia travel is suspended ("YES" in step S21), the ECU 11 moves to the step S22. On the other hand, When the ECU 11 determines based on the drive operation that the N inertia travel is not suspended ("NO" in step S21), the ECU 11 moves to END.

Next, the ECU 11 stores the time during which the N inertia travel is continued, the current position and the current vehicle speed in association with the section inclusive of the current position in the road information (Step S22).

Then, the ECU 11 matches the data of the current position and the current vehicle speed with an approximate data, with reference to the information associated with the section inclusive of the current position (Step S23).

Thereafter, the ECU 11 calculates an expected value of time during which the N inertia travel is continued based on the data matched in the step S23 (Step S24). To be specific, the ECU 11 calculates an average time during which the N inertia travel is continued from the approximate data of the current position and the current vehicle speed, with reference to the road information. In the present embodiment, the ECU 11 may use a median in place of the average as the expected value.

Next, the ECU 11 determines whether or not the expected value of the N inertia travel time calculated in the step S24 is equal to or smaller than a predetermined value (Step S25). The predetermined value of time, which is indicative of a time during which the gasoline mileage is deteriorated compared to the gasoline mileage in a case in which the vehicle 1 is traveled without the N inertia travel control, is predetermined based on experimental measurements.

When the ECU 11 determines that the expected N inertia travel time is equal to or smaller than the predetermined value ("YES" is step S25), the ECU 11 moves to the step S26. On the other hand, When the ECU 11 determines that the expected N inertia travel time is larger than the predetermined value ("NO" is step S25), the ECU 11 moves to END.

In a case that the ECU 11 moves to the step S26, the ECU 11 registers the section in the learning DB as the N inertia travel prohibition section. In the present embodiment, the ECU 11 sets the flag ON indicative of the N inertia travel prohibition associated with the section in the road information.

Figure 8:
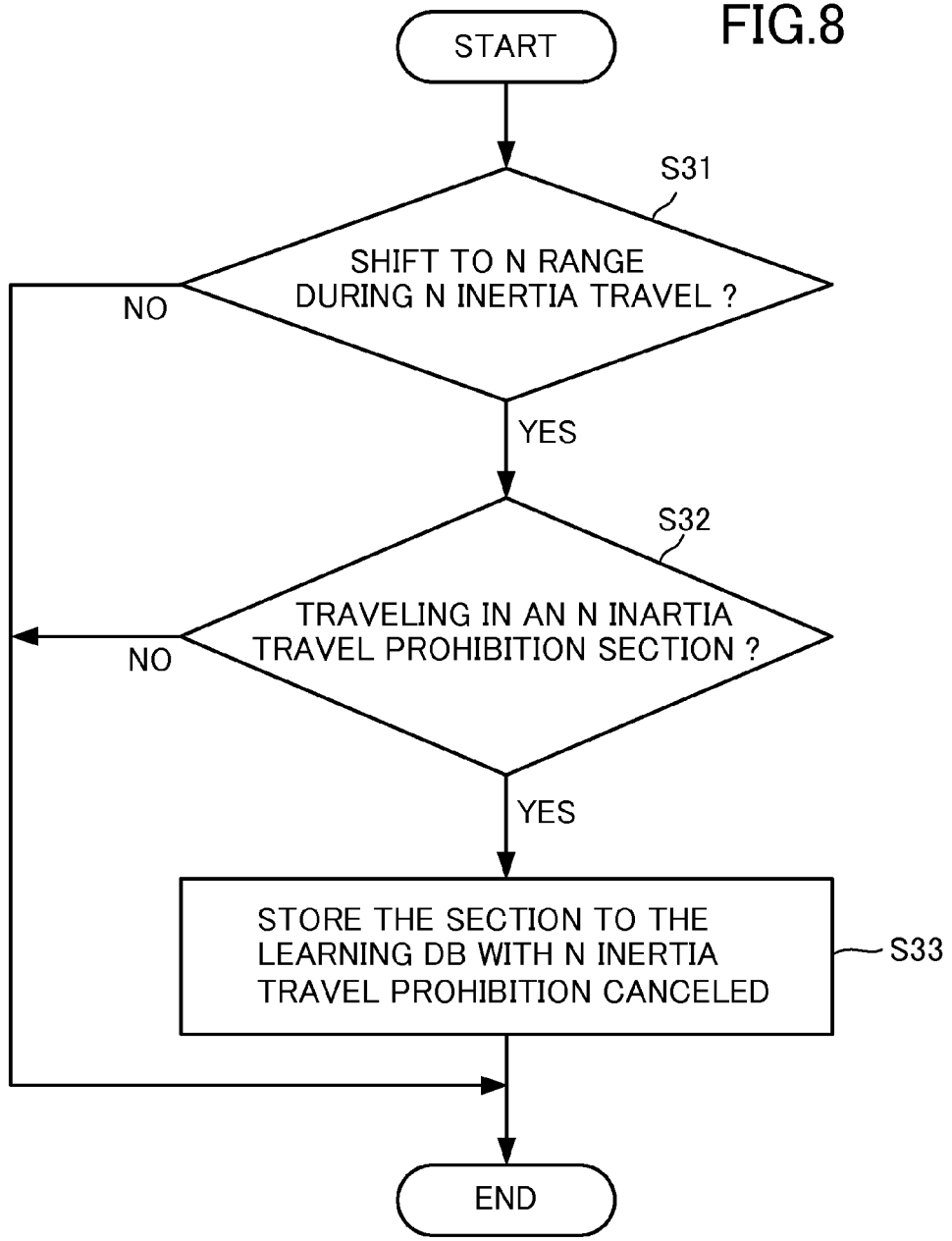
FIG. 8 is a flow chart of the N inertia travel prohibition cancel control according to the embodiment of the present invention.

Next, an N inertia travel prohibition cancel control by the driving operation by the driver will be explained with reference to FIG. 8. The process explained hereinafter is realized by a program preliminarily stored in the ROM of the ECU 11, and executed by the CPU at a predetermined time interval.

First, the ECU 11 determines whether or not there is a shift to the N range during an inertia travel by the D range, i.e., during a non-driving period (Step S31). The ECU 11 determines whether or not there is a shift of a directed range from the D range to the N range based on the signal inputted from the operation position sensor 29. Further the ECU 11 determines whether or not the accelerator pedal is depressed based on the signal inputted from the accelerator opening degree sensor 30.

Then, the ECU 11 determines that there is the shift to the N range during the inertia travel by the D range, when there is the shift of the directed range from the D range to the N range and the accelerator pedal is not depressed ("YES" in step S31), the ECU 11 moves to the step S32. On the other hand, when the ECU 11 determines that there is not the shift to the N range during the inertia travel by the D range ("NO" in step S31), the ECU 11 moves to END.

In a case that the ECU 11 moves to the step S32, the ECU 11 determines whether or not the vehicle 1 is traveling in the N inertia travel prohibition section. The ECU 11 checks whether or not the flag indicative of the N inertia travel prohibition in the section inclusive of the current position is set ON, with reference to the road information stored in the navigation apparatus 38. When the flag indicative of the N inertia travel prohibition in the section inclusive of the current position is set ON, the ECU 11 determines that the vehicle 1 is traveling in the N inertia travel prohibition section.

When the ECU 11 determines that the vehicle 1 is traveling in the N inertia travel prohibition section ("YES" is step S32), the ECU 11 moves to the step S33. On the other hand, when the ECU 11 determines that the vehicle 1 is not traveling in the N inertia travel prohibition section ("NO" is step S32), the ECU 11 moves to END.

In a case that the ECU 11 moves to the step S33, the ECU 11 registers to the learning DB so that the N inertia travel prohibition in the section is cancelled. More specifically, the ECU 11 changes the flag indicative of the N inertia travel prohibition in the section inclusive of the current position from ON to OFF, the flag being provided in the learning DB stored in the navigation apparatus 38.

As will be understood from the foregoing description, even if an inertia travel control is being performed, when the inertia travel control is suspended by the driving operation of the driver, the ECU 11 according to the present embodiment can store the information, indicative of the fact that the inertia travel control is suspended by the driving operation of the driver, in association with the position information. For this reason, performance of the inertia travel control can be prohibited in a case that the vehicle 1 travels at the same position from next time on. Accordingly, for example, even if the inclination of the road at the current position is equal to the inclination of another road in which the inertia travel control is permitted, when the driver does not desire the inertia travel control and applies the brake due to a fact such as that the road width ahead of the current position is narrower, the ECU 11 can store information indicative of the prohibition of the inertia travel control, thereby making it possible to avoid the performance of the inertia travel control the next time the vehicle 1 travels the section inclusive of the current position. Therefore, the ECU 11 can prevent the inertia travel control, which imparts the sense of discomfort to the driver, from being performed, while the gasoline mileage can be improved by performing the inertia travel control.

In a case that there are less than the predetermined number of incidents in which the inertia travel control is suspended at the current position, the ECU 11 can prevent the inertia travel control from being prohibited in the section inclusive of the current position. Therefore, even if the inertia travel control is suspended by a brake operation due to a cutting-in by another vehicle in spite of the fact that the driver originally desires the inertia travel control, the ECU 11 can prevent the inertia travel control from being prohibited in the section inclusive of the current position.

Further, the ECU 11 can determine whether or not there is the driving operation by the driver for a suspension of the inertia travel control, based on an operation amount of the accelerator pedal, brake pedal and the steering wheel by the driver. Therefore, the ECU 11 can prohibit the performance of the inertia travel control afterwards in the section which the driver does not desire the inertia travel control.

Furthermore, the ECU 11 can cancel the prohibition of the inertia travel control so that the inertia travel control in the section can be resumed, in a case that there is the driving operation by the driver to desire the inertia travel control in the section wherein the inertia travel control was prohibited due to the driving operation in the past.

Still further, when an average value of a plurality of inertia travel control continuation times associated with the current position is equal to or smaller than a predetermined value, there is a possibility that the gasoline mileage is deteriorated in a case that the inertia travel control is performed only for a short period of time in the section inclusive of the current position compared to a case that the inertia travel control is not performed at all in the same section. For this reason, the ECU 11 can prohibit the inertia travel control in the section inclusive of the current position, so that the gasoline mileage of the vehicle 1 is not deteriorated.

The foregoing description is directed to a case in which the vehicle control apparatus according to the present invention is applied to the FR vehicle having the six-speed automatic transmission 5 mounted thereon.

However, the vehicle control apparatus according to the present invention may otherwise be applied to a vehicle having an automatic transmission with other than six-speed gear stages mounted thereon or a Front Engine Front Drive (hereinafter simply referred to as FF) vehicle. Further, the construction of the automatic transmission 5 according to the present embodiment is simply an example, and therefore the automatic transmission 5 may have another construction. Furthermore, the vehicle 1 may have a Continuously Variable Transmission (hereinafter simply referred to as CVT) mounted there on in place of the automatic transmission 5.

Still further, there has been explained in the foregoing description about the case that the vehicle control apparatus according to the present invention is applied to the vehicle 1 having only the engine 2 mounted thereon as a power source. However, the present invention is not limited to this case, and the vehicle control apparatus according to the present invention may otherwise be applied to a hybrid vehicle 100 having the engine 2, a motor generator MG1 and a motor generator MG2 mounted thereon as power sources as explained hereinafter. Another example of the vehicle control apparatus according to the present embodiment will be explained hereinafter with reference to FIG. 9. The explanation of another example of the vehicle control apparatus according to the present embodiment will be omitted herein with the constitutional elements and parts the same as those of the first embodiment of the vehicle control apparatus bearing the same reference numerals of the first embodiment of the vehicle control apparatus. Only the points of difference of the vehicle control apparatus in the second embodiment from the first embodiment will be explained in detail.

Figure 9:
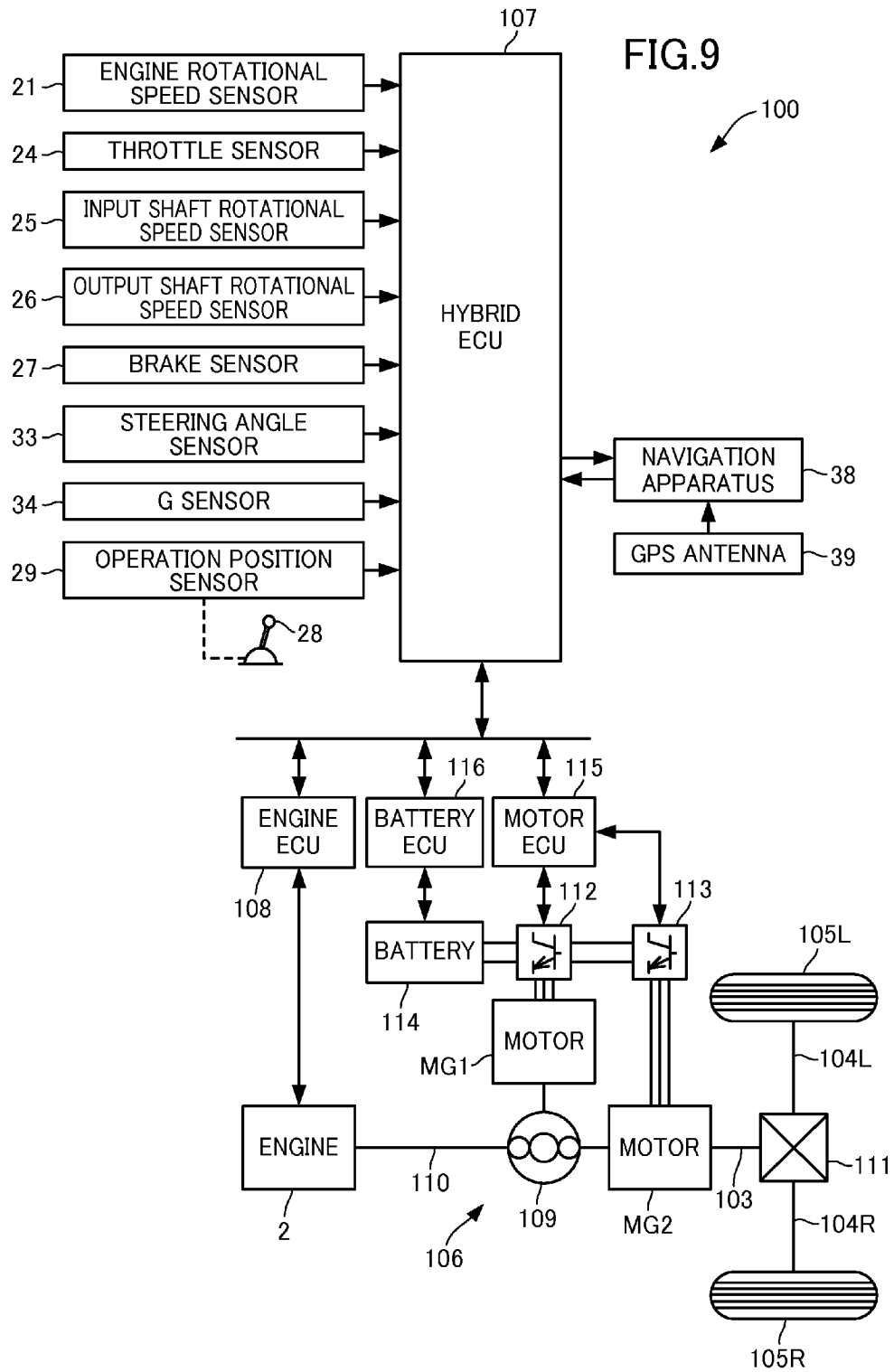
FIG. 9 is a schematic diagram showing a vehicle mounted thereon with the vehicle control apparatus according to another example of the present embodiment of the present invention.

As shown in FIG. 9, the hybrid vehicle 100 is provided therein with the engine 2 constituting an internal combustion engine, a power transmission apparatus 106 that transmits a power generated by the engine 2 to driving wheels 105L, 105R through a propeller shaft 103 and drive shafts 104L, 104R, a hybrid ECU 107 that controls various parts of the hybrid vehicle 100 and an engine ECU 108 that controls the engine 2.

The engine ECU 108 is adapted to communicate with the hybrid ECU 107 through a high-speed Controller Area Network (hereinafter simply referred to as CAN) or the like, to perform control of the engine 2 such as fuel injection control, ignition control and intake air amount adjustment control and the like based on control signals inputted from the hybrid ECU 107 and the detection signals inputted from various sensors that detect a driving state of the engine 2, and to output data regarding to the driving state of the engine 2 to the hybrid ECU 107 as necessary.

The power transmission apparatus 106 is provided therein with a power division mechanism 109 that divides a power into a power to transmit to the driving wheels 105L, 105R and a power to drive the motor generator MG1, the power being generated by the motor generators MG1, MG2, alternately converting between electric power and rotational power, and the engine 2.

The power division mechanism 109, connected with an end portion of a crankshaft 110 constituting an output shaft of the engine 2, is constituted by a planetary gear mechanism adapted to divide the power generated by the engine 2 and to integrate driving forces transmitted from a side of the motor generator MG1 and the driving wheels 105L, 105R.

Therefore, the power division mechanism 109 is adapted to have the motor generator MG1 function as a generator by one of divided powers, while rotating the driving wheels 105L, 105R by the other of the divided power powers.

Further, the power division mechanism 109 is adapted to integrate the power inputted from the engine 2 and the power inputted from the motor generator MG1, when the motor generator MG1 is functioning as the generator and the engine 2 is operating.

Furthermore, the power division mechanism 109 is adapted to rotate the crankshaft 110 by the power inputted by the motor generator MG1 to have the engine 2 started, when the motor generator is functioning as the generator and the engine 2 is stopping.

The power outputted from the power transmission apparatus 106 is adapted to be transmitted to the driving wheels 105L, 105R through a differential gear 111 and the drive shafts 104L, 104R.

The motor generator MG2, when supplied with a driving power, is adapted to function as a driving source, so that the power generated by the motor generator MG2 is transmitted to the driving wheels 105L, 105R.

Further, the motor generator MG2, when not supplied with a driving power, is adapted to decelerate rotation of the driving wheels 105L, 105R, while functioning as a power regenerator that converts the rotational power into electric power.

The motor generator MG1 and the motor generator MG2 are adapted to exchange electric power with a battery 114 through an inverter 112 and an inverter 113, so that the battery is charged and discharged.

To control the motor generators MG1, MG2 explained so far, the hybrid vehicle 100 is provided therein with a motor ECU 115. The motor ECU 115 is adapted to output a switching control signal to the inverter 112 and the inverter 113, so that the motor generators MG1, MG2 are controlled.

Further, the motor ECU 115 is adapted to communicate with the hybrid ECU 107 through the high-speed CAN, to control the inverters 112, 113 in accordance with signals inputted from the hybrid ECU 107, thereby respectively controlling the motor generators MG1, MG2. Furthermore the motor ECU 115 is adapted to output data regarding the driving state of the motor generators MG1, MG2 to the hybrid ECU 107 as necessary.

The hybrid vehicle 100 is provided therein with a battery ECU 116. The battery ECU 116 is constituted by a microprocessor which is provided therein with a CPU, a ROM, a RAM, a flash memory and input/output ports.

The battery ECU 116 is adapted to be inputted with signals necessary to control a state of the battery 114, the signals being, for example, indicative of a inter-terminal voltage between terminals of the battery 114, charge/discharge electric current of the battery 114 and temperature of the battery 114 and the like.

Further the battery ECU 116 is adapted to output data regarding the state of the battery 114 to the hybrid ECU 107 as necessary. For example, the battery ECU 116 is adapted to calculate a State Of Charge (hereinafter simply referred to as SOC) indicative of residual capacity of the battery 114 based on an accumulated value of the charge/discharge electric current of the battery 114, thereby outputting the calculated SOC to the hybrid ECU 107.

The hybrid ECU 107 is constituted by a microprocessor which is provided therein with a CPU, a ROM, a RAM, a flash memory and input/output ports. The ROM is stored with a program to have the microprocessor function as the hybrid ECU 107. This means that the CPU executes the program stored in the ROM using the RAM as a work area, so that the microprocessor functions as the hybrid ECU 107.

The hybrid ECU 107, being connected each other with the engine ECU 108, the motor ECU 115 and the battery ECU 116 through the high-speed CAN, is adapted to exchange various control signals and data with the engine ECU 108, the motor ECU 115 and the battery ECU 116.

In the hybrid vehicle 100 so far explained, the hybrid ECU 107, similarly to the ECU 11 explained in the foregoing description, constitutes the N inertia travel start determination unit 61, the N inertia travel stop determination unit 66, the N inertia travel control permission condition determination unit 71, the N inertia travel determination unit 72 and the N inertia travel requesting unit 73. Further the hybrid ECU 107 is adapted to have the hybrid vehicle 100 travel in the inertia travel without performing the regeneration by the motor generator MG2, when the hybrid ECU 107, in a way similar to the determination by the ECU 11, determines that the condition for performing the N inertia travel control is satisfied. Furthermore, the hybrid ECU 107 is adapted to have the hybrid vehicle 100 travel in the inertia travel while performing the regeneration by the motor generator MG2 in the non-driving period in a case that the N inertia travel flag indicative of the N inertia travel prohibition in the section inclusive of the current position is ON.

By the construction as set forth above, in a case that the hybrid vehicle 100 travels under performance of the regeneration by the motor generator MG2, a stop position of the hybrid vehicle 100 can be nearer than a position that the driver desires due to an excessive braking force, causing the driver to operate the accelerator pedal to adjust the stop position of the hybrid vehicle 100, resulting in deterioration of gasoline mileage and power consumption. In this case, the hybrid ECU 107 can perform the N inertia travel control so that the accelerator pedal is suppressed from being operated even though the regeneration is not performed by the motor generator MG2, thereby making it possible to improve the gasoline mileage and power consumption.

On the other hand, the hybrid ECU 107 can prohibit the N inertia travel, so that the gasoline mileage and power consumption can be suppressed from being deteriorated, under a state in which traveling under performance of the N inertia travel control results in deterioration of the gasoline mileage and power consumption compared to traveling under regeneration by the motor generator MG2.

As can be understood from the foregoing description, the vehicle control apparatus according to the present invention can provide a vehicle control apparatus which can improve the gasoline mileage without imparting the sense of discomfort to the driver, and is useful for a vehicle that can travel in the inertia travel during a non-driving period of the vehicle.

EXPLANATION OF REFERENCE NUMERALS 1 vehicle
2 engine
3 torque converter
4 transmission mechanism
5 automatic transmission
11 ECU
21 engine rotational speed sensor
24 throttle sensor
27 brake sensor
28 shift lever
29 operation position sensor
30 accelerator opening degree sensor
31 throttle valve
33 steering angle sensor
34 G sensor
38 navigation apparatus
39 GPS antenna
46 lock-up clutch
61 N inertia travel start determination unit
62 driver operation determination unit
63 vehicle state determination unit
64 read-ahead determination unit
65 logical AND performance unit
66 N inertia travel stop determination unit
67 driver operation determination unit
68 vehicle state determination unit
69 read-ahead determination unit
70 logical OR performance unit
71 N inertia travel control permission condition determination unit
72 N inertia travel determination unit
73 N inertia travel requesting unit
81 current position obtaining unit
82 current vehicle speed obtaining unit
83 read-ahead curvature obtaining unit
84 read-ahead inclination obtaining unit
85 vehicle motion prediction model generation unit
93 read-ahead curvature obtaining unit
94 read-ahead inclination obtaining unit
95 N inertia travel control prohibition learning unit
97 N inertia travel prohibition section DB

The invention claimed is:

1. A vehicle control apparatus that can stop a transmission of a driving power from a power source of a vehicle to driving wheels of the vehicle while the vehicle is traveling, comprising a position determination unit that determines a current position of the vehicle, a road information storing unit that stores a road information indicative of a road inclusive of the current position of the vehicle determined by the position determination unit in association with a road status of the road, an inertia travel unit that stops the transmission of the driving power from the power source to the driving wheels based on the road information indicative of a road ahead of the current position, to have the vehicle travel in an inertia travel, a drive operation detecting unit that detects drive operations indicative of at least a suspension of the inertia travel and a start of the inertia travel, a suspension information storing unit that stores therein an information indicative of the current position and of a fact that the inertia travel is suspended thereat, in association with the road information thereat, in the case that the drive operation indicative of the suspension of the inertia travel is detected, and an inertia travel prohibition unit that prohibits the inertia travel of the vehicle in a predetermined section inclusive 2. The vehicle control apparatus as set forth in claim 1, in which the inertia travel prohibition unit prohibits the inertia travel of the vehicle in a predetermined section inclusive of the current position on a condition that the number of informations indicative of the suspension of the inertia travel associated with the current position becomes equal to or more than a predetermined value.

3. The vehicle control apparatus as set forth in claim 1, in which the drive operation detecting unit detects an operation amount of at least one of an accelerator pedal, a brake pedal, and a steering wheel.

4. The vehicle control apparatus as set forth in claim 1, in which the road status includes at least either one of an inclination of the road and a curvature of the road.

5. The vehicle control apparatus as set forth in claim 1, in which the inertia travel prohibition unit cancels a prohibition of the inertia travel of the vehicle in the predetermined section inclusive of the current position in a case that a driver's operation to start the inertia travel is detected while the inertia travel is being prohibited.

6. The vehicle control apparatus as set forth in claim 1, in which the inertia travel prohibition unit stores an inertia travel duration of the inertia travel in the predetermined section inclusive of the current position in the road information storing unit when the inertia travel is suspended, and prohibits the inertia travel in the predetermined section inclusive of the current position in the case that an average value of a plurality of the stored inertia travel durations is equal to or smaller than a predetermined value.

7. The vehicle control apparatus as set forth in claim 1, in which the inertia travel unit terminates the inertia travel when the inertia travel unit judges that a travelling state of the vehicle does not satisfy a predetermined condition for allowing the vehicle to travel in the inertia travel.

8. The vehicle control apparatus as set forth in claim 1, in which the power source is constituted by an internal combustion engine, the vehicle has a transmission arranged between the internal combustion engine and the driving wheels, and the inertia travel unit stops the transmission of the driving power to the driving wheels by the transmission, to have the vehicle travel in the inertia travel.

9. The vehicle control apparatus as set forth in claim 1, in which the power source is constituted by an internal combustion engine and an electric motor that can be regenerated during a non-driving period of the vehicle, and the inertia travel unit stops the regeneration by the electric motor during the non-driving period, to have the vehicle travel in the inertia travel.

10. A vehicle control apparatus that can stop a transmission of a driving power from a power source of a vehicle to driving wheels of the vehicle while the vehicle is traveling, comprising an electronic control unit programmed
to determine a current position of the vehicle,
to store a road information indicative of a road inclusive of the current position of the vehicle determined by the electronic control unit in association with a road status of the road,
to stop the transmission of the driving power from the power source to the driving wheels based on the road information indicative of a road ahead of the current position, to have the vehicle travel in an inertia travel,
to detect drive operations indicative of at least a suspension of the inertia travel and a start of the inertia travel,
to store an information in the electronic control unit, the information being indicative of the current position and of a fact that the inertia travel is suspended thereat, in association with the road information thereat, in the case that the drive operation indicative of the suspension of the inertia travel is detected, and
to prohibit the inertia travel of the vehicle in a predetermined section inclusive of the current position based on the information stored in the electronic control unit.

11. The vehicle control apparatus as set forth in claim 10, in which the electronic control unit is programmed to prohibit the inertia travel of the vehicle in a predetermined section inclusive of the current position on a condition that the number of informations indicative of the suspension of the inertia travel associated with the current position becomes equal to or more than a predetermined value.

12. The vehicle control apparatus as set forth in claim 10, in which the electronic control unit is programmed to detect an operation amount of at least one of an accelerator pedal, a brake pedal, and a steering wheel.

13. The vehicle control apparatus as set forth in claim 10, in which the road status includes at least either one of an inclination of the road and a curvature of the road.

14. The vehicle control apparatus as set forth in claim 10 in which the electronic control unit is programmed to cancel a prohibition of the inertia travel of the vehicle in the predetermined section inclusive of the current position in a case that a driver's operation to start the inertia travel is detected while the inertia travel is being prohibited.

15. The vehicle control apparatus as set forth in claim 10, in which the electronic control unit is programmed to store therein an inertia travel duration of the inertia travel in the predetermined section inclusive of the current position when the inertia travel is suspended, and prohibits the inertia travel in the predetermined section inclusive of the current position in the case that an average value of a plurality of the stored inertia travel durations is equal to or smaller than a predetermined value.

16. The vehicle control apparatus as set forth in claim 10, in which the electronic control unit is programmed to terminate the inertia travel when the electronic control unit judges that a travelling state of the vehicle does not satisfy a predetermined condition for allowing the vehicle to travel in the inertia travel.

17. The vehicle control apparatus as set forth in claim 10, in which the power source is constituted by an internal combustion engine, the vehicle has a transmission arranged between the internal combustion engine and the driving wheels, and the electronic control unit is programmed to stop the transmission of the driving power to the driving wheels by the transmission, to have the vehicle travel in the inertia travel.

18. The vehicle control apparatus as set forth in claim 10 in which the power source is constituted by an internal combustion engine and an electric motor that can be regenerated during a non-driving period of the vehicle, and the electronic control unit is programmed to stop the regeneration by the electric motor during the non-driving period, to have the vehicle travel in the inertia travel.

* * * * *